United States Patent [19]
Shutt

[11] 3,964,318
[45] June 22, 1976

[54] DISCONNECT DEVICE FOR AIRCRAFT PITCH OR ROLL CONTROL SYSTEM

[75] Inventor: Donald P. Shutt, Long Beach, Calif.

[73] Assignee: Western Gear Corporation, Lynwood, Calif.

[22] Filed: Mar. 3, 1975

[21] Appl. No.: 554,509

[52] U.S. Cl. .......................... 74/471 R; 116/114 R; 192/16; 192/38; 192/71; 200/47; 200/61.39
[51] Int. Cl.² .................. G05G 9/00; F16D 67/02; F16D 11/06
[58] Field of Search ............... 74/471 R; 192/14, 16, 192/38, 39, 71; 200/61.39, 47; 73/139; 81/52.5; 116/114 R

[56] References Cited
UNITED STATES PATENTS

| | | | |
|---|---|---|---|
| 2,978,207 | 4/1961 | Davidson | 244/83 A X |
| 2,989,160 | 6/1961 | Woodruff | 192/38 X |
| 3,039,133 | 6/1962 | Milton et al. | 192/16 X |
| 3,192,335 | 6/1965 | Todd et al. | 200/61.39 |
| 3,262,532 | 7/1966 | Phelps | 192/16 X |
| 3,274,827 | 9/1966 | Sturtevant | 73/139 |
| 3,554,337 | 1/1971 | Denkowski | 192/16 X |

*Primary Examiner*—Allan D. Herrmann
*Attorney, Agent, or Firm*—Forrest J. Lilly

[57] ABSTRACT

A device is disclosed by which two paired controls in an aircraft flight control system, such as pitch controls, or the roll controls, which are ordinarily operated in coordination by the pilot by use of a single operating control may, when the control on one side of the airplane is damaged and jammed, accomplish a disconnect of that side, and so free the opposite side control for operation. The aircraft can often be flown with just the one side control in commission, if freed from the opposite side. The device is in the nature of a bell crank, and the disconnect means is in the hub thereof.

Also disclosed is a novel bi-directional sensor incorporated in the input arm of the bell crank, and which gives an indication to the pilot when the linkage to the corresponding control surface, or the control surface, is damaged and jammed. This sensor has application other than in aircraft control systems.

17 Claims, 11 Drawing Figures

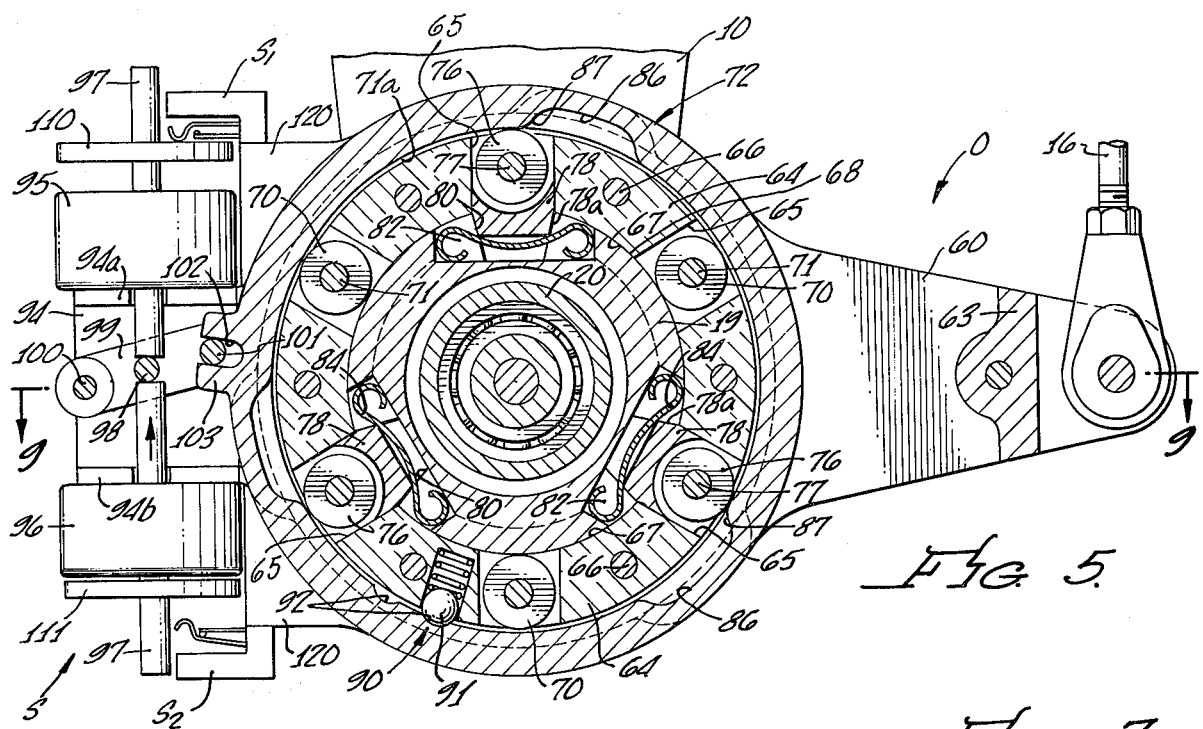
Fig. 5
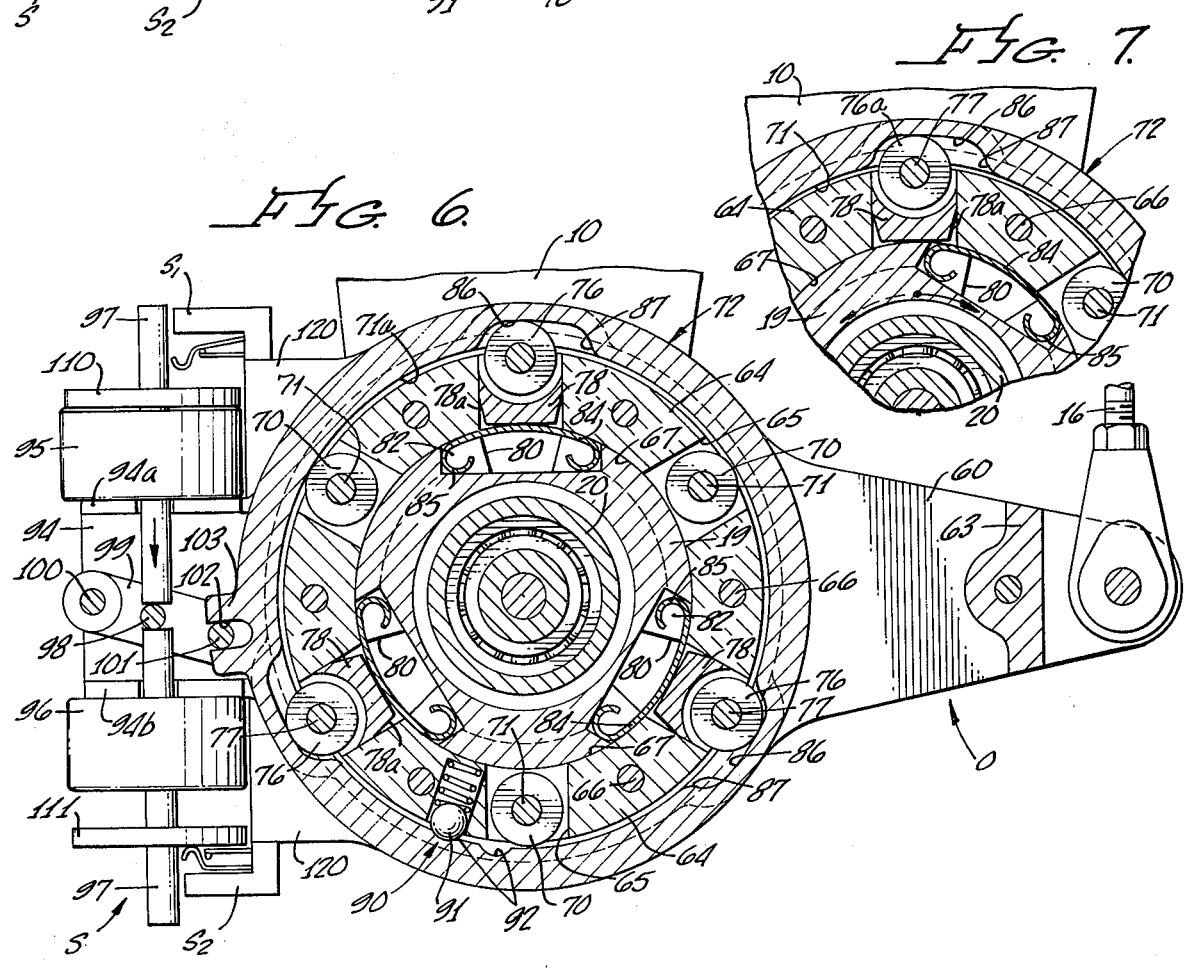
Fig. 6
Fig. 7

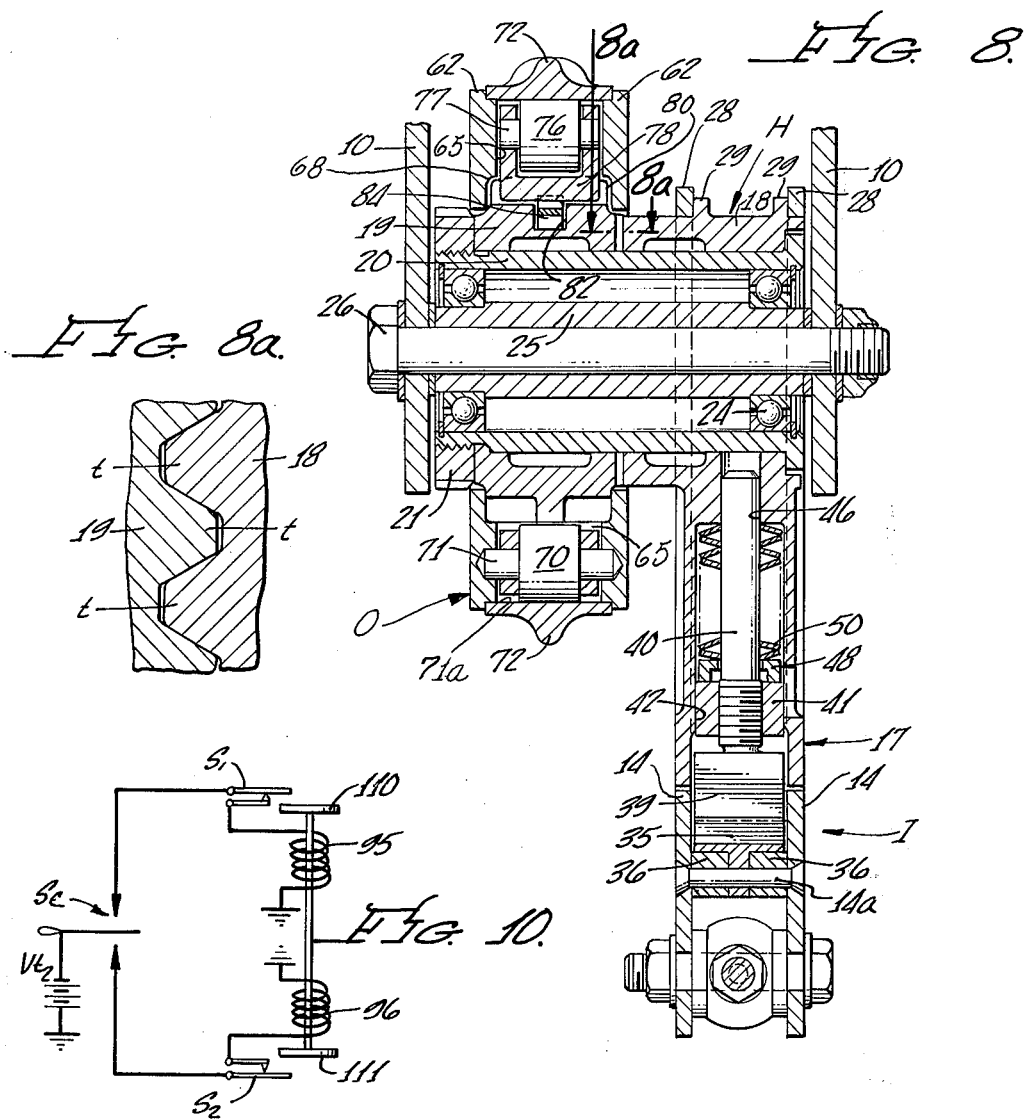
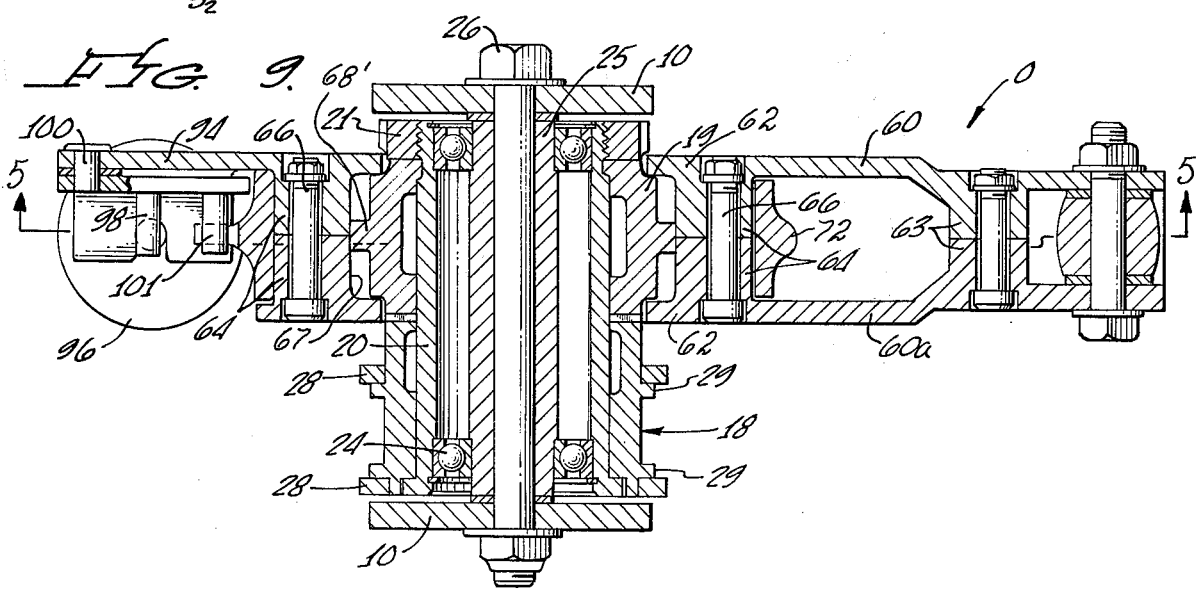

DISCONNECT DEVICE FOR AIRCRAFT PITCH OR ROLL CONTROL SYSTEM

FIELD OF THE INVENTION

This invention relates generally to pitch and roll control systems for aircraft, and particularly to devices for disconnecting the right or left pitch or roll control when jammed or damaged to free the opposite side control for unhindered operation.

BACKGROUND OF THE INVENTION

Using the pitch control system for illustration, the pilot may have a control by which he transmits power assisted torque through right and left subsystems to the right and left pitch control surfaces of the wing. It may occur that one or the other of the surfaces or its corresponding subsystem becomes damaged or jammed. Ordinarily, if one is jammed, the other is bound also. Normally locked disconnect devices have been proposed for incorporation in the actuating subsystems for the right and left control surfaces, adapted, when operated, to disconnect the jammed side, and free the balance of the overall control system for unhindered operation. The airplane may ordinarily be flown in such a partially disabled condition.

BRIEF SUMMARY OF THE INVENTION

The system of the invention provides a novel means for sensing and indicating over-load torques when the pilot attempts to operate the jammed system, and one side or the other fails to respond freely. The invention further provides a novel disconnect device for each side, normally affording operative linkages from the pilot control to the jammed control surfaces on the two sides, but affording in each a novel disconnect device of high reliability, total immunity to "g" forces, and of mechanical sophistication appropriate to the high safety factor called for in such a system. The system also includes pilot controlled solenoids for unlocking the normally locked disconnect device on the jammed or disabled side.

Any such system must work under great stresses, (for example, under forces arising from maneuvers of say 6 g's) and owing to the magnitude of the losses which may be suffered if they fail (such as, e.g., loss of the airplane and its pilot or crew), must have an extremely high reliability factor. The locking and unlocking unit, especially, must not be subject to failure owing to high g's, or other causes. A general purpose of the present invention is accordingly the provision of a system of this character eminently suited to its field of use, achieving a reliability rating suitable to the high responsibility it is required to assume.

Very briefly described, the system provides a bell crank unit in the pitch or roll flight control subsystem to transmit power assisted pilot effort torque. When subjected to high system jam loads, the unit has the capability of sensing overload torque when the pilot attempts to operate the system, and an indicating signal is transmitted to the pilot, warning of the overload. The pilot may then elect to disconnect the overloaded side of the system. If so, he initiates an electric command, causing a locking means in the hub of the bell crank unit to disconnect internally, and thereby permit relative motion between the input and output arms of the bell crank unit without transmission of torque through the unit. On another pilot initiated electric command, the locking means is armed to snap-engage and lock when the input arm of the bell crank is driven by the pilot to normally synchronized position relative to the output arm of the bell crank.

A present preferred embodiment of the invention will be described in detail, with reference to the accompanying drawings, and from which broad and detailed aspects of the invention and its characteristics and qualities will be fully understood.

BRIEF DESCRIPTION OF THE DRAWINGS

FIG. 5 is a transverse vertical section taken on line 5—5 of FIG. 2, showing the disconnect device in normal, locked position;

FIG. 6 is a view similar to FIG. 5, but showing the device in unlocked position;

FIG. 7 is a fragmentary view of the device as seen in FIG. 5, showing the locking device in an unsynchronized position;

FIG. 8 is a vertical axial section taken on line 8—8 of FIG. 3;

FIG. 8a is an enlarged detail on the section line 8a—8a of FIG. 8;

FIG. 9 is a horizontal section taken on line 9—9 of FIG. 5, looking downward; and FIG. 10 is a diagram showing a simple illustrative circuit diagram for the solenoid system.

FIG. 1 shows conventionally a power assisted pilot effort control unit P, and right and left operating linkages (r and l) for right and left controls such as paired pitch or roll control airfoils $C_r$ and $C_l$. Each of the two linkages includes a disconnect unit D according to the invention. In the event of damage to either control airfoil, or to the portion of the linkage between a disconnect unit and corresponding airfoil, the corresponding disconnect unit can be unlocked, and the balance of the system so freed for use. The airplane can frequently be flown with only the remaining airfoil operative.

FIG. 2 shows a disconnect unit D to be (in the illustrative embodiment) in the general nature of a bell crank B, with input and output arms I and O pivoted on a stationary axis A—A, which is fixed relative to spaced, fixed, aircraft frame brackets arms 10. A push and pull input operating rod 12 constituting a part of the linkage from the pilot control unit P is pivotally connected to and between the extremities of two flat, transversely spaced parallel arm members 14 constituting the input arm I of the bell crank B. The two arm members 14 are interconnected and spaced by riveting (see, e.g., rivet 14a in FIG. 8).

Figure 1:
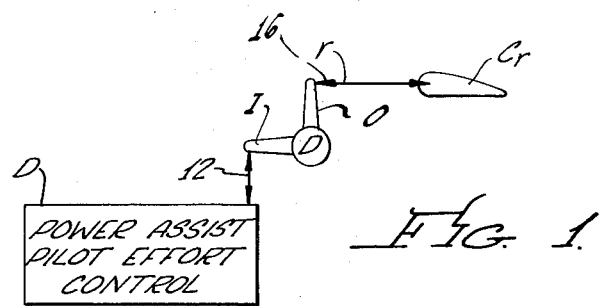
FIG. 1 is a diagram of an aircraft control system incorporating the present invention, shown only in block diagram.

The bell crank B has a later described coupling hub H on axis A—A' carrying the aforementioned outpt arm O, to which is connected push and pull rod 16 leading from the disconnect unit D to the control surface $C_r$ or $C_l$ as the case may be. Also, there is a later described locking means normally locking the output arm O to the hub H, but which is releasable to disconnect the arm O from the hub H.

Sandwiched and limitedly laterally movable between the two arm members 14 of input arm I of the bell crank is a reaction arm 17, which may be considered for some purposes as a part of input arm means including also the input arm I. This arm 17 is formed, coaxially with axis A–A', with a part 18 of the hub H, and the output lever O is on a part 19 of the hub H (see FIG. 8), the parts 18 and 19, in the illustrative embodiment, having interengaging teeth t on their ends, preferably "curvic" face teeth (FIG. 8a), 12 in number, by which they are drivingly intercoupled. The two-part intercoupling hub permits assembly with the input and output arms at different angles. The advantage of the curvic face teeth is the absence of backlash, as is understood in the art. The toothed hub parts 18 and 19, which are thus interengaged with one another end to end, are fitted onto a headed sleeve 20, externally screw-threaded at one end, and the assembly is clamped together by a nut 21. Sleeve 20 is on the outer race ring of a ball bearing 24, the inner race ring of which is seated on a spacer sleeve 25 through which passes a center bolt 26 fastened between frame parts 10 affixed to the aircraft frame structure. The assembly of hub parts 18 and 19, sleeve 20 and nut 21 is thus rotatable with the outer race ring of the bearing 24.

The laterally spaced input arm members 14 have hub portions 28 relatively rotatable on the hub part 18 of reaction arm 17, said hub part 18 having flange elements 29 just inside the hub portions 28, so as to properly position the input arm I axially on the hub part of the reaction arm. The parts are so made that tightening of the nut 21 properly forces together the two parts 18 and 19 of the hub H, and the hub portions 28 of the input arm I are mounted on the hub part 18 of the reaction arm 17 for free rotation of the arms relative to one another through a limited angle of the order of 2°. The means imposing this limitation will appear hereinafter.

The reaction arm 17 embodies a novel sensor to furnish, for the information of the pilot, as he attempts to operate the control surfaces, a signal that at least one of the control surfaces, or the linkage between the disconnect output arm O and the control surface, has become jammed or otherwise damaged, and is inoperative. This novel sensor will next be described.

The reaction arm 17 is shaped at its swinging or lower end (as viewed in FIG. 3) as a yoke 30, with spaced yoke arms 31. Within the confines of these yoke arms 31, and mounted on and bridging the space between the input arm members 14, is a transverse bridge piece 34, made up of a hardened wear member 35 of generally Y-form, with relatively wide-angle arms, backed and thus supported by strut members 36 bridging between the input arm members 14. The arms of the Y-formed member 34 comprise angular cam plates positioned symmetrically relative to the longitudinal center line or plane of the input arm I, in the general form of a wide-angled V. The struts 36 will be seen to back up and support the arms and stem of the hardened Y-member 34.

Figure 2:
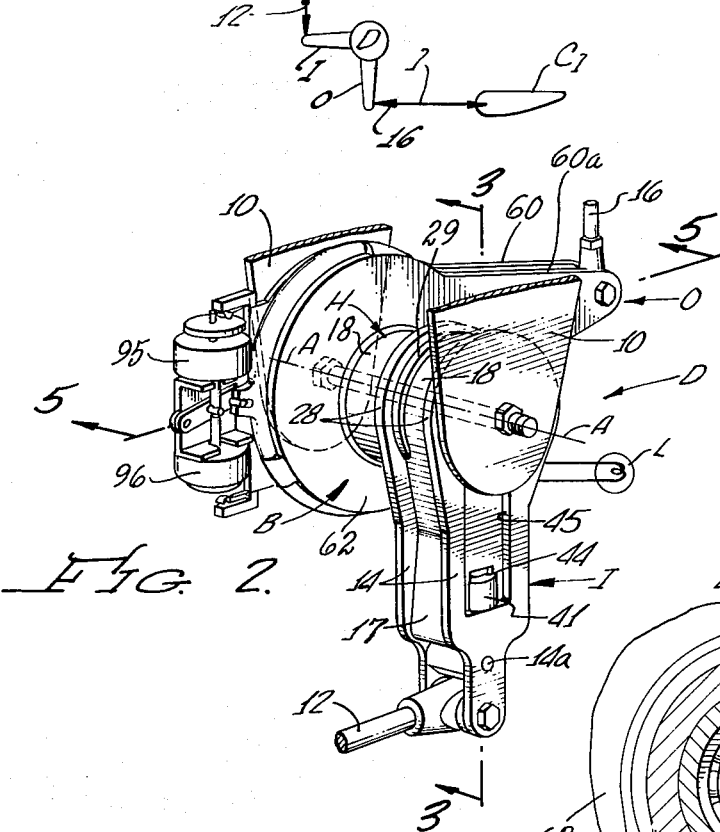
FIG. 2 is a perspective view of the disconnect device of FIG. 1.
Figure 3:
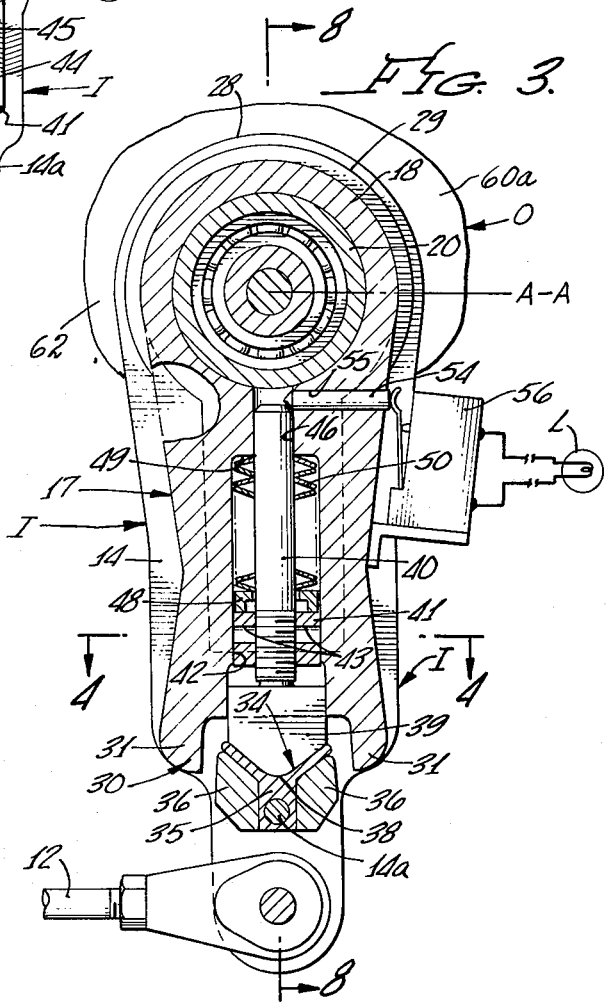
FIG. 3 is a transverse vertical section taken in accordance with line 3—3 of FIG. 2.

Engageable in the wide V-angle of the cam plates of the member 34 on input arm I is the symmetrical bull or wedge nose, or centrally rounded wedge end 38, at the bottom of a cam follower plunger 39 that is constrained to move longitudinally in reaction arm 17. The arms I and 17 are shown in FIGS. 2 and 3 to be normally mutually centered with the struts 36 equally spaced from the stops afforded by yoke arms 31. Arm I may move angularly against presently described spring opposition in either direction from its normal centered position relative to arm 17, through an angle of, in this case, 54 minutes of arc, but is limited to such angle, on each side of center, by engagement of its strut 36 with the opposed yoke arm 31.

Figure 4:
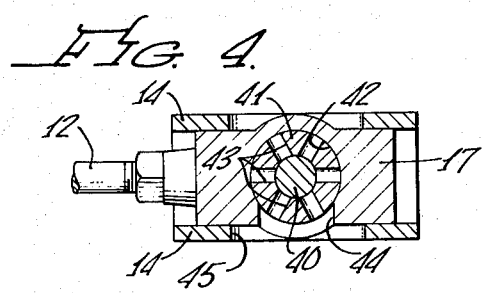
FIG. 4 is a transverse horizontal section taken on line 4—4 of FIG. 3.

The plunger 39 is on the lower end of a stem 40, screw-threaded at its lower end to receive a round nut 41 (FIGS. 3 and 4). The nut 41 is received in a longitudinal bore 42 in the reaction arm 17, and there is adaptation for adjustment of the position of nut 41 on stem 40, in the nature of six radial holes 43 in the nut accessible through a window 44 in one side of arm 17 and a longitudinally extending slot 45 formed in arm member 14. Thus, a tool embodying a pin receivable in the bores or sockets 43 may be used through window 44 and the longitudinal space 45 in arm member 14 to turn the nut 41 on the threaded extent of the stem 40. The upper end of the aforementioned bore 42 meets a reduced bore 46 extending on up into the hub 18. A washer 48 encircles stem 40 and seats down on the nut 41, and above said washer and between it and the shoulder 49 at the junction of bores 42 and 46 is a Bellville spring 50 assembled from a plurality of angular washers in the usual fashion.

It will be apparent that the Bellville spring 50 exerts downward force through washer 48 and nut 41, and thence through stem 40 on the plunger 39, forcing the latter downwardly into a normally centered position into the wide-angle V-shaped seat formed by the bridge piece 34. The nut 41 is adjusted on the stem to adjust the preload or bias force exerted downwardly by spring 50 against plunger 39, pressing it into its angular seat formed by member 34. The Bellville spring 50 thus preloads the bull or wedge nosed plunger 39. Thus, when the input arm I is swung (by pilot effort) in either direction from its centered position of FIG. 3, and the reaction arm is not blocked by external damage, the reaction arm will swing with the input arm, retaining its centered position relative to the input arm, and motion is transmitted from the input arm to the reaction arm, and on to the control surface, in normal operation. Should the control surface, or the linkage from output arm O to the control surface, be damaged, however, to the extent of inoperability, and be in a jammed, relatively immovable condition, the input arm will move, under pilot effort, and against the opposition of spring 50, from its centered position to a position at which a strut member 36 thereof engages the opposed yoke arm 31 of the now frozen reaction arm 17. This movement causes one cam plate or the other of the V-cam 34 to cam the sensor plunger 39 upwardly against the force of the spring 50.

The upper extremity of stem 40 is chamfered, as indicated, to engage the chamfered extremity of a pin 54 working through a lateral bore 55 in one side of arm 17, the outer extremity of which operates to close the contacts (not shown) of a switch 56 mounted on one edge of the reaction arm (see FIG. 3) when the stem 40 is elevated relatively to actuating pin 54 and thus cams it outwardly, in the manner that will be obvious from FIG. 3.

As will be seen, either a pilot-initiated pull or push on the linkage rod 12 tends to move the input arm I on axis A–A', and if the reaction arm is not restrained by some undue jamming in the output linkage and airfoil surface in question, the reaction arm will move with the input arm, owing to the preload force of the spring 50, to rotate the hub H of the bell crank, and with it the output arm O and output link 16, in normal fashion. However, if some jamming action has occurred in the output involving link 16 or the control parts extending on to and including the control surface in question, the reaction arm 17 may become bound, and either moved only with great difficulty, or may be jammed entirely. In such case, the pilot assisted effort exerted through input linkage 12 will be sufficient to move the input arm I against the bias or preload centering force exerted on arm I by the spring 50 in the frozen reaction arm, through the small angle provided until the strut 36, on one side or the other, engages the corresponding stop afforded at 31 by the frozen reaction arm. As the arm I moves angularly away from its centered position relative to the frozen reaction arm 17, the plunger 39 in arm 17 is cammed upwardly, and its stem 40 elevated in now relatively stationary reaction arm 17, forcing pin 35 outwardly so as to close the contacts of switch 56 leading, for example, to an indicator light represented at L. The closure of this switch occurs as or slightly before the strut 36 on arm I engages the limit stop on the corresponding yoke arm 31 of arm 17. The pilot is thus signalled that he has a jammed condition on one side of his control system, and is alerted to take appropriate action.

Such action may be to disconnect the reaction arm 17 and bell crank hub H from the output arm O internally of the hub H, freeing the input part of the bell crank from the jammed output part, so that the input linkage, represented at 12, the input arm 1 and the hub H can idle, i.e., be freed of the jammed part, enabling operation of the power assist pilot effort control unit to be used to operate the undamaged side of the control system without interference by the damaged side.

To this point, the bell crank mechanism of the invention and the sensor parts furnishing the pilot with information as to jamming of the control on one side have been discussed. The disconnect device in the bell crank by which the output side of the disconnect device can thereupon be freed from the input side will next be described.

The output arm O of the bell crank B is comprised of two spaced parallel arm members 60 and 60a, formed at the hub end of the bell crank arm with parallel ring portions 62. These ring portions of the arms 60 and 60a are formed at the tapered extremities of the arms with raised interengaging pads, such as at 63, and around the insides of the peripheral portions of the rings 62 with interengaging pads 64. The two ring portions of the arms provide a set of six circumferentially spaced pairs of the pads 64, each pair forming in effect a bridging lug between the spaced arm members 60 and 60a, and these are spaced by six radial and parallel sided slots 65. The two ring portions 62 of the arms 60 and 60a are connected by bolts and nuts through the interengaging pads 64, as indicated at 66, and are thus integrated with one another. The interengaging pairs of pads 64 thus form lugs which define the aforementioned radial slots 65.

The pairs of ring members 60 and 60a together with their pads 64 have inside edge surfaces 67 which are arcuate and which turn on the peripheral portions 68 and 68' of the hub member 19. Alternate slots 65 contain bearing rollers 70 on pins 71 mounted on and between the rings 62 of output arm O. These rollers 70 protrude slightly from the slots 65 between pads 64, and bearing thereon is the interior cylindrical surface 71a of a lock ring 72, concentric with axis A-A', and with the rings 62. Though bearing on the rollers 70, the lock ring 72 has its outside edge shoulders preferably set into indentations in the inside corner portions of the rings 62, as shown in FIG. 8, and it will be understood that the lock ring 72 turns easily in the seats so provided for it in the outer peripheral portions of the ring members 62. In addition to the three rollers 70, there are three rollers 76 in the remaining three slots 65, and these rollers 76 are mounted on pins 77 carried by the two spaced side walls of dogs or plungers 78 mounted slidably in the remaining slots 65 between pads 64, as well illustrated in FIGS. 6 and 8. The rollers 76 will be seen to comprise the operative outer extremities of the plungers 78.

With the device in the locked position of FIG. 5, the rollers 76, in the same manner as the aforementioned rollers 70, protrude slightly from the slots 65 and bear on the inner periphery 71a of the lock ring 72, in the same manner as the rollers 70 shown on the inner periphery of said ring. The lower ends of the plungers 78 have lower wedge ends 78a which, while the rollers 76 are in engagement with the circular inner periphery of the lock ring 72, project radially inward beyond the arcuate inside surfaces 67 of the pads 64, and downwardly into correspondingly wedge-shaped slots 80 sunk into the hub 19 transversely thereof. The peripheral portion 68 of the hub part 19 may be of the width indicated in FIG. 8 in the regions of those three slots 65 which accommodate the locking plungers 78, but, for lightness, may be narrowed to ribs 68' in other locations, e.g., FIG. 9. A narrow medial slot 82 is cut below the bottom of the slot 80, and transversely thereof, extending beyond the limits of the slot 80 at each end. This slot 82 accommodates a normally arcuate leaf spring 84, with coil end portions 85 (see FIGS. 5 and 6). The normal position of the springs 84 is as shown in FIG. 6, in conformance with the curve defined by the arcuate inner edges 67 of the rings 62 and pads 64 and they are bent into the positions shown in FIG. 5 upon radially inward movement of the locking plungers 78. The angles of the wedge ends 78a of the plungers are such that the plungers are non-self-locking against forces exerted upon them (position of FIG. 5) by the confronting end walls of the correspondingly angled slots 80 in the hub member 19, under pilot-initiated torque exerted on said member 19. Thus, the locking plungers tend to be cammed radially outward in response to such torque, excepting as they are restrained by engagement of their outer ends against the lock ring 72. Also, the locking plungers 78 are biased to move radially outward by return action of the deflected leaf springs 84. Such radially outward movement of the locking plungers is accommodated in one position (FIG. 6) of the lock ring 72, by three cups or concavities 86 sunk into the internal periphery thereof at 120° circumferential spacing when the lock ring 72 is rotated to the unlock position of FIG. 6. As illustrated in said figure, the plungers 78 and their rollers 76 are then cammed and/or spring actuated to shift radially outward far enough to reach into the concavities 86 and to be extracted entirely from the slots 80, the outer surfaces of the springs 84 then conforming to or lying in the cylindric exterior surface of the hub member 19. The camming action may be used alone, but is aided by the springs, which are therefore preferred. The springs further serve to support the plunger against radially inward entry into the slots 80 when the hub part 19 is in the position of FIG. 6. Actually, the springs could be used without the wedges, but use of both increases quickness of action and reliability and is preferred.

The cups or concavities 86 are rounded at opposite ends, as at 87, furnishing cams which, upon rotation of the lock ring 72 from the unlocked position of FIG. 6 to that of FIG. 5, will engage and cam the plungers inwardly so as to be capable of passing under the internal peripheral surface 71 of the locking ring, by which the plungers are positively locked in their locking positions of FIG. 6.

Referring to FIGS. 5 and 6, a detent 90 in the form of a spring pressed ball 91 is seated in one of the pads 64 and is engageable with one or the other of two circumferentially spaced ball seats 92 sunk in the interior of the lock ring 72. The ring is thus releasably locked in either of the two positions of FIGS. 5 and 6.

For shifting of the lock ring 72 between these two locking and unlocking positions, a solenoid means S is mounted on an extension bracket 94 extending from a ring member 62 of the output arm O oppositely from the output portion of said arm.

In the present illustrative embodiment, the solenoid means S comprises two axially aligned solenoids 95 and 96, spaced axially and mounted on bracket walls 94a and 94b. The two solenoids have axially aligned armature shafts 97, whose confronting ends engage opposite sides of an operating pin 98 extending from the midpoint of a lever 99 pivoted at one end on the aforementioned bracket 94, as at 100, and engaging at its other end, via a pin 101, in a slot 102 formed in a bifurcated radial extension 103 from lock ring 72. Note at this point that the arm 99 pivoted at 100, has a two-to-one travel multiplying ratio, such that motion exerted on the pin 98 by the solenoid armature shafts 97 is thus doubled at the lock ring 72.

On the shafts 97, outside the solenoids 95 and 96, are armature disks 110 and 111, and it will be obvious that when solenoid 95 is energized, for example, the armature disks 110 and 111 and their shafts 97 will be moved from the position illustrated in FIG. 5 to that of FIG. 6. This latter action of course shifts lock ring 72 from the normal locked position of FIG. 5 to the disconnect position of FIG. 6. And, of course, energization of solenoid 96 causes reverse motion of the parts from the position of FIG. 6 to that of FIG. 5, resulting in internal re-locking of the device, as will be more fully described hereinafter. Suitable manual switch controlled circuitry for accomplishing alternate energizations and de-energizations are shown in FIG. 10 in simplified form. In said figure, the two locking and unlocking solenoids are represented at 95 and 96, respectively, and the coorresponding longitudinally movable armature disks at 110 and 111, respectively. The windings of solenoids 95 and 96 are shown as grounded at one end, and as leading to a stationary arm of normally closed switches $S_1$ and $S_2$, respectively, at the other. The movable arms of said switches, which are normally closed, are opened as a result of engagement by an armature disk on the shaft of the associated solenoid when energized and moved through a predetermined stroke. The movable arms of switches $S_1$ and $S_2$ are connected to the normally open outside contacts of pilot controlled three-position switch $S_c$. The movable center arm of this switch is shown connected to one side of DC voltage source Vt, the other side of which is indicated as grounded.

Switches $S_1$ and $S_2$ are mounted on brackets 120 on output arm I, as seen in FIG. 5, and their movable switch contacts are engaged and opened by the armature disks 110 and 111 at the outer limits of their strokes.

In the position shown in FIG. 5, the detent is in the "locked" position and the pilot controlled three-way switch $S_c$ (FIG. 10) is in the "center-off" position. If the pilot commands the switch $S_c$ to the "disengage" position, power will flow to the disengage solenoid 95 through the normally closed contacts of switch $S_1$, and the lock ring will be rotated to the disengaged position detent. As the "disengaged" position is approached the switch $S_1$ will be actuated by engagement by the armature disk 110, opening the circuit to the disengage solenoid.

Switch $S_2$ was actuated to the normally closed position as the disengage solenoid armature disk 111 moved away from the switch upon a "disengage command", and the circuit is therefore "armed" to allow power to flow through the engage solenoid when the pilot moves the command switch $S_c$ to "engage". When this "engage" command is given the lock ring will be driven by the solenoid 96 toward the "lock" position. If the slots in the center hub are not aligned with the output arm pawls, the solenoid will stall while the pawls ride the O.D. of the hub. When the hub and pawls are aligned (input and output arms are synchronized), the pawls will be cammed into engaged position by the lock ring completing its rotation to locked position. It should be emphasized that the solenoid power is on only as long as it takes to move the lock ring from one position to the other, even though the control switch $S_c$ remains in a command position.

The two-to-one lever 99 is used to take advantage of the solenoid force versus travel characteristics. The solenoid force on the armature is inversely proportional to the square of the initial separation distance of the armature disk and shaft from final position. Therefore, by reducing the travel by one-half, the force exerted on the lock ring is increased by a factor of four. Dividing this four times factor by a lever ratio of two, results in obtaining twice the actuating force on the lock ring, as there would be if the solenoid armature were directly connected to the lock ring.

Thus, FIGS. 2–5, 8 and 9 show the device in its normal internally locked position, wherein the pilot, by effecting push or pull effort on the input links 12 of the two normally locked disconnect units D, can accomplish desired adjustment of the paired control elements in the wings. Upon damage to or jamming of one of the linkages from the corresponding disconnect unit to the corresponding control element in the corresponding wing, the pilot effort control unit will become stalled, and this condition will be evidenced to the pilot by the lighting up of the damage indicator light L or other signal. Should the pilot then elect to attempt to fly the plane with aid only of the opposite side control (now blocked by reason of intercoupling with the damaged opposite side control), he energizes, by manual switch Sc and circuitry diagrammed in FIG. 10, the solenoid 95 of the damaged side disconnect unit. The energized solenoid 95 then exerts a magnetic force urging its armature elements 110 and 97, and therefore its actuating lever for the lock ring 72, to move from the normally locked position of FIG. 5 to the unlocked position of FIG. 6, so that the lock ring 72 will move into a position with its plunger receiving cups 86 registering with the locking plungers 78. Thereupon, said locking plungers shift radially outward to enter partially into cups 86, and to become extracted totally from the wedge-shaped slots 80 in the hub 19, as shown in FIG. 6. The hub H, inclusive of its hub part 19, is thereby unlocked or freed from the output arm O, which will be in a jammed condition along with the jammed output linkage 16 or control surface actuated by the latter. The pilot of course is then free to attempt flying the plane, using only the wing control in the opposite wing.

As described earlier, the wedge-nosed plungers 78, upon the described alignment therewith of cups 86, may be forced radially outward to the unlocking position of FIG. 6 either by direct action of the leaf springs 84, or by the wedging action of the wedge-shaped slots 80 in the hub H under torque exerted in either direction from the pilot control.

The parts being in the disconnect position of FIG. 6, to re-lock the device, solenoid 96 is energized, so as to urge the locking ring 72 and locking parts back to the position of FIG. 5. But assuming now that the locking parts are in the disconnect position of FIG. 6, the hub part 19, being freed from the plungers 78, its wedge slots 80 probably will have become unsynchronized, i.e., misaligned with, the locking plungers 78 (see FIG. 7), so that the effort to re-lock the device by moving the locking plungers back radially inward into the wedge slots 80 will initially fail. However, the plungers 78 can then ride on the circumferential exterior surface of the hub part 19 (FIG. 7), and the latter moved circumferentially, in either direction, by pilot effort, until the wedge slots 80 do align with the locking plungers 78. The locking ring 72 and energized locking solenoid 95 simply stall until this alignment has been attained by pilot effort movement of the input arm I and hub H. Once the wedge slots 80 become aligned with the plungers 78, with the solenoid 95 still energized and attempting to rotate the locking ring to the position of FIG. 5, such action does take place, the cup 86 moving out of alignment with the plungers, and in doing so, camming the latter radially inward to the original and normal locked position of FIG. 5.

Attention is directed to the fact that the locking plungers are confined by the lock ring 72, and are thereby supported adequately against g forces during maneuvering.

An illustrative embodiment of the invention has now been described in one presently preferred form. It will be understood that various changes in design, structure and arrangement may be made within the spirit and scope of the invention without departing from the scope of the appended claims.

What is claimed is:

1. In a normally locked disconnect device for use in an aircraft control linkage:
   a bell crank adapted for pivotal mounting on an axis on an aircraft structural part, and having input arm means and an output arm interposed in said linkage;
   said bell crank having an inner hub rotatable on said axis by said input arm means,
   said inner hub having a plurality of circumferentially spaced radial outwardly opening slots in its periphery,
   said output arm of said bell crank including an outer hub concentric with said axis, with a plurality of circumferentially interspaced lugs thereon around said inner hub, and with radial slots therebetween adapted for radial alignment with the slots in the aforesaid inner hub,
   locking plungers rectilinearly slidable in said radial slots between said lugs of said outer hub and positioned normally in radially inward locking positions wherein they are disposed partially in said outer hub slots and project threfrom into locking reception in said inner hub slots to lock said inner hub and said outer hub against relative rotation,
   a lock ring encircling and relatively rotatable about the outer perimeter of said outer hub, with internal arcuate concentric slots adjacent and in engagement with the outer extremities of said locking plungers when said plungers are engaged in said inner hub slots,
   said lock ring having a concentric interior circular bearing surface engageable with and rotatable on the outer extremities of said locking plungers to hold them in their said radially inward locking positions in said inner hub slots, said circular bearing surface having circumferentially spaced, radially outwardly extending plunger receiving recesses therein at a circumferential spacing such as to be capable of alignment with said radial slots between said lugs, said recesses being of a depth in the radially outward direction to accommodate complete radially outward extraction of said plungers from said inner hub slots.

2. The subject matter of claim 1, including solenoid means mounted on said output arm of said bell crank and interlinked with said locking ring to shift it circumferentially between positions of alignment and non-alignment of said recesses relative to said radial outer hub slots.

3. The subject matter of claim 1 including springs in the radially outwardly opening slots in said hub engaging and normally urging said locking plungers to move radially out of said slots.

4. The subject matter of claim 1, wherein the inner end extremities of said locking plungers have wedge ends, as seen in sections perpendicular to said axis, and said slots in said inner hub have wedge surfaces engaging said wedge ends of said plungers, the wedge angles of said plungers and wedge surfaces of said slots in said inner hubs being non-self-locking, whereby torque exerted on said inner hub cams said wedge ends out of said slots in said inner hub.

5. The subject matter of claim 4, wherein said lugs comprise circumferentially spaced ring segments, having inner arcuate surfaces rotatable against cylindrical exterior surfaces on said inner hub.

6. The subject matter of claim 5, wherein the outer extremities of said plungers comprise anti-friction rollers which engage said circular interior bearing surface of said lock ring.

7. The subject matter of claim 6, including also anti-friction rollers mounted on said outer hub engaging and rotatably supporting said lock ring.

8. The subject matter of claim 4, including a medial slot intersecting perpendicularly each of said wedge surfaced slots in said inner hub, said medial slot extending beyond said wedge surfaces of said wedge-surfaced slots in both directions, and
   leaf springs lodged in said medial slots engageable with the inner extremities of said locking plungers to urge them out of said inner hub.

9. The subject matter of claim 2, wherein said solenoid means comprises axially aligned lock and unlock solenoids with reciprocating shafts and plunger disks mounted on the remote ends of said shafts, and
a lever pivotally mounted on said output arm of said bell crank, having one short lever arm pivoted to the near extremities of said shafts and one longer lever arm operatively connected to said lock ring to shift it arcuately between plunger locking and plunger release positions.

10. The subject matter of claim 1, wherein said recesses in said lock ring comprise cup-like concavities with camming formations at the ends thereof adapted to engage said plungers and cam them radially inward to positions inwardly of the inner circumference of said lock ring.

11. The subject matter of claim 5, wherein said output arm of said bell crank comprises two transversely spaced and interconnected arm plates, each with an outer hub in the form of a hub ring, and wherein said interspaced ring segments bridge between said hub rings, and said lock ring bridges between and is rotatable on said hub rings.

12. The subject matter of claim 1, wherein said input arm means of said bell crank comprises an input arm having a hub rotatably mounted on said inner hub, said input arm extending radially from said inner hub of said bell crank,
a reaction arm fixed to said inner hub and normally lying alongside and aligned with said input arm,
a yoke on the swinging extremity of said reaction arm,
a sensor plunger mounted for reciprocation along said reaction arm,
a V-cam member on said input arm for reception of the corresponding extremity of said sensor plunger,
spring means on said reaction arm preloading said sensor plunger into said V-cam member with a bias force,
stops on said input arm normally spaced from but engageable with the arms of said yoke in response to forcible swinging movement thereof with said reaction arm substantially restrained against movement, whereby said plunger is cammed longitudinally of said reaction arm, and
signal means responsive to such plunger movement.

13. The subject matter of claim 1, wherein said input arm means of said bell crank comprises an input arm having a hub rotatably mounted on said inner hub, said input arm extending radially from said inner hub of said bell crank,
a reaction arm fixed to said inner hub and normally lying alongside and aligned with said input arm,
a V-cam member on said input arm for reception of the corresponding extremity of said sensor plunger,
spring means on said reaction arm preloading said sensor plunger into said V-cam member with a bias force,
stops on said input arm normally spaced from but engageable with opposed stop portions of said reaction arm in response to forced pivotal movement of said input arm while said reaction arm is under restraint against pivotal movement, whereby said plunger is cammed longitudinally of said reaction arm by one or the other side of said V-cam, and
actuating means operable by said movement of said plunger.

14. In a mechanical sensor for sensing and responding to a mechanical resistance,
an input arm pivoted at one end on an axis and adapted to be torqued in either direction about its pivot axis,
a second arm pivoted at one end to swing in parallelism with the first arm,
a V-cam member on said input arm facing in the direction of the pivoted end of said arm,
a sensor plunger mounted for reciprocation longitudinally along said second arm and engageable in the angle of said V-cam member,
spring means on said second arm preloading said sensor plunger into said V-cam member with a bias force,
stops on said input arm normally spaced from but engageable with opposed stop portions of said reaction arm in response to forced pivotal movement of said input arm while said reaction arm is under restraint against pivotal movement, whereby said plunger is cammed longitudinally of said reaction arm by one or the other side of said V-cam, and
actuating means operable by said movement of said plunger.

15. In a normally locked disconnect device for use in an aircraft coupling linkage:
two concentric inner and outer hubs adapted for rotative oscillation relative to one another on a common axis, the inner hub comprising a driver and the outer hub comprising a driven member having a cylindric outer wall,
circumferentially spaced pairs of generally radial, alignable slots, one slot of each pair sunk radially into the outer periphery of the inner hub, and the other slot of each pair extending radially through the cylindric wall of the outer hub,
locking plungers slidably positioned in the slots in the outer hub and normally projecting with slidable engagement into the corresponding slot in said inner hub, and
a lock ring rotatable about said outer hub, formed with interior circular arc bearing surfaces concentric with said axis, and positioned adjacent the outer extremities of said locking plungers, said bearing surfaces bearing on the radially outward extremities of said plungers outside said outer drum to constrain them in locking position with the inner extremities thereof seated in said slots in said inner hub, there being intervening radially outward recesses between said bearing surfaces adapted to receive radially outward extremities of said locking plungers when said ring is rotated to a position aligning said recesses with said locking plungers, said recesses having a depth to accommodate sufficient radially outward movement of said plunger to accomplish complete extraction of said plungers from said inner hub slots.

16. The subject matter of claim 15, including also means for moving said plungers to extract them from said inner hub slots as said radially outward recesses in said lock ring move into alignment with said locking plungers.

17. The subject matter of claim 16, including also solenoid means for rotating said lock ring between predetermined positions in one of which said recesses in said lock ring are aligned with said inner hub slots, and said locking plungers are withdrawn from said inner hub slots and received in said locking ring recesses, and in the other of which said solenoid means has exerted a rotational force on said lock ring to misalign its recesses relative to said inner hub slots, and said outer hub has been rotated to align the outer hub slots with the inner hub slots, said lock ring recesses being formed at their ends to cam said locking plungers radially inward as the lock ring recesses move out of alignment with the inner and outer hub slots as alignment of said inner and outer hub slots is attained.

* * * * *